United States Patent

Marmonier et al.

[11] 4,003,787
[45] Jan. 18, 1977

[54] DEVICE FOR SUPPORTING A FUEL-PIN CLUSTER WITHIN A NUCLEAR REACTOR FUEL ASSEMBLY WRAPPER

[75] Inventors: Pierre Marmonier; Bernard Mesnage; Jean Teulon, all of Aix-en-Provence; Jean-Pierre Simonneau, Manosque, all of France

[73] Assignee: Commissariat a l'Energie Atomique, Paris, France

[22] Filed: Mar. 11, 1975

[21] Appl. No.: 557,319

[30] Foreign Application Priority Data

Mar. 28, 1974  France ............................ 74.10906

[52] U.S. Cl. .............................. 176/76; 176/78; 176/81
[51] Int. Cl.² .............................. G21C 3/30
[58] Field of Search .................... 176/76, 78, 81

[56] References Cited

UNITED STATES PATENTS

| | | | |
|---|---|---|---|
| 3,158,549 | 11/1964 | Fowler | 176/78 |
| 3,743,578 | 7/1973 | Agranier et al. | 176/76 X |
| 3,755,077 | 8/1973 | Agranier et al. | 176/78 |
| 3,764,471 | 10/1973 | Ripley | 176/78 |
| 3,795,579 | 3/1974 | Chenal et al. | 176/78 |
| 3,862,884 | 1/1975 | Jabsen | 176/78 |
| 3,890,197 | 6/1975 | Butts et al. | 176/78 |

FOREIGN PATENTS OR APPLICATIONS

| | | | |
|---|---|---|---|
| 862,208 | 3/1961 | United Kingdom | 176/78 |

*Primary Examiner*—Samuel W. Engle
*Assistant Examiner*—Peter A. Nelson
*Attorney, Agent, or Firm*—Cameron, Kerkam, Sutton, Stowell and Stowell

[57] ABSTRACT

A supporting member for an array of parallel rails each carrying one row of slidably mounted pins of a fuel clister is placed coaxially at the lower end of a vertical fuel assembly wrapper. The ends of the rails are engaged in vertical slots formed in the supporting member and are secured by locking-rods mounted in open grooves located transversely to the slots in the outer faces of the supporting member.

9 Claims, 1 Drawing Figure

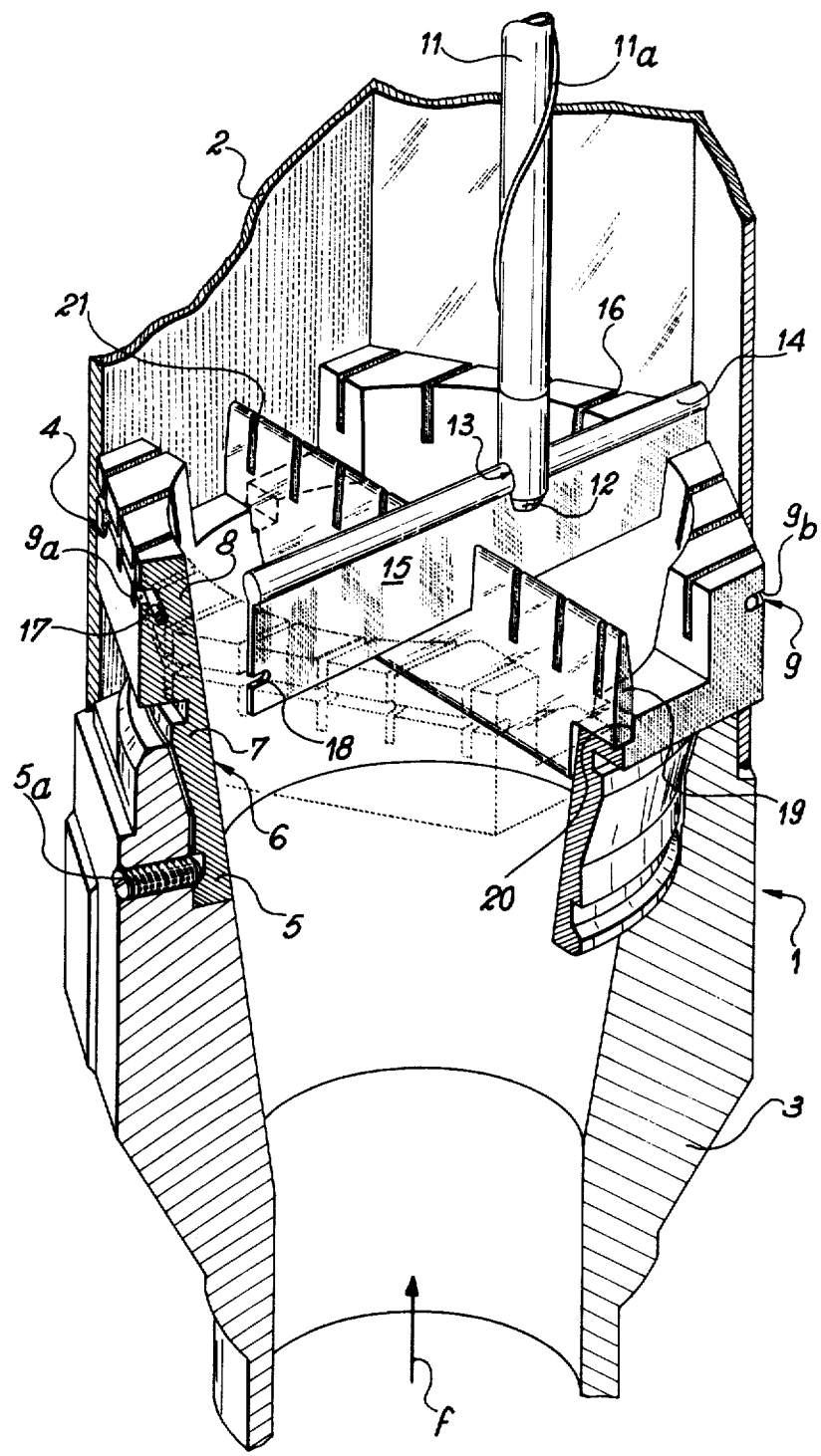

DEVICE FOR SUPPORTING A FUEL-PIN CLUSTER WITHIN A NUCLEAR REACTOR FUEL ASSEMBLY WRAPPER

This invention relates to a device for supporting and positioning the parallel pins of a fuel cluster with respect to each other. These pins are employed in a nuclear reactor core and are usually provided in the form of pencils of fissile or fertile fuel material each provided with an external cladding of stainless steel. Said fuel cluster is placed vertically within a casing or so-called wrapper of polygonal cross-section which is open at the top end and provided with a bottom end-fitting. The complete assembly constituted by the wrapper and the cluster of pins contained in said wrapper is usually referred-to as a fuel assembly.

It is known that the core of a nuclear reactor and especially a fast reactor is constituted by an array of fuel assemblies of this type in juxtaposed relation and supported by a diagrid consisting of a support plate provided with apertures in which are engaged the end-fittings of said fuel assemblies so that these latter can extend vertically. The fuel assemblies are cooled during reactor operation by continuous circulation of a liquid metal usually consisting of sodium which penetrates into said assemblies through their end-fittings beneath the diagrid and flows upwards within the wrappers in contact with the fuel-pin clusters which are surrounded by said wrappers. In consequence, the pins must be suitably locked in position within their respective wrappers, particularly in order to be maintained in parallel relation, to delimit suitable cross-sectional areas for the flow of coolant between the pins with a view to ensuring uniform cooling of the cluster and finally to prevent mechanical vibrations produced by the flow of liquid sodium.

One expedient which has already been contemplated for attaching and locking the pins of a fuel cluster within a fuel assembly wrapper consists in supporting the pins on an internal grid carried by the wrapper above the corresponding end-fitting or by a circular ring secured to this latter. For the purpose of mounting the assembly, it is necessary in this case to insert each pin in the grid one by one, which constituted a difficult and time-consuming operation. A further arrangement which has already been contemplated consists in forming said grid by means of a series of parallel rails rigidly fixed in position with respect to a supporting member or the like which is secured to the bottom portion of the wrapper. Said rails are intended to engage in sliding grooves formed in the end-caps of the fuel pins, thus making it possible on the one hand to mount said pins on said rails and on the other hand to lock said pins in position within the wrapper. The rails are preferably constructed of sheet metal of calibrated thickness having a die-stamped portion which forms a beaded edge for securing the fuel pins by inserting said beaded edge in grooves of suitable shape formed in the corresponding fuel-pin end-caps.

This invention is concerned with an improvement made in a device for supporting the pins of a fuel cluster in an assembly of the type aforementioned and relates more especially to a particular arrangement of the parallel rails and of the fastening means which serve to establish a connection between said rails and a supporting member provided at the lower end of the wrapper.

To this end, the device under consideration comprises a supporting member placed coaxially at the lower end of the vertically-disposed fuel assembly wrapper for a series of parallel rails on the upper extremities of which are slidably engaged grooves formed in the end-caps of a row of pins of the fuel cluster and is distinguished by the fact that the supporting member has vertical parallel slots in which are engaged the lateral extremities of the rails, said rails being secured by locking means mounted within open grooves which are formed in the sides of the supporting member and through which extend the vertical slots, said locking means being intended to cooperate with those portions of the rails which pass through the grooves within said vertical slots.

In a particular form of construction, the means for locking the rails with respect to the supporting member are constituted by elements in the form of locking-rods engaged in the open grooves of the supporting member and adapted to penetrate into notches formed in the rails at the level of said grooves.

In another alternative form of construction, the locking means are constituted by pins passed through holes formed in the parallel rails at the level of the open grooves of the supporting member.

Among the assembly of rails which serve to support the fuel pins of the cluster in rows, the rail located at the center of the supporting member necessarily has a relatively substantial length and additionally supports the high weight of the fuel pins of the corresponding row. In order to endow said rail and also the adjacent rails with a higher load-carrying capacity as well as constant spacing of these latter over their entire length, the device advantageously comprises in accordance with a subsidiary feature a transverse comb which extends at right angles to the plane of the rails and is mounted in the supporting member in the central plane thereof, said comb being provided with teeth separated by slots in which the parallel rails are inserted. By way of alternative, the spacing between the fuel pins is fixed by means which are connected directly to the pins of the fuel cluster so as to ensure a constant spacing between a row of pins carried by one rail and a row of pins carried by one of the adjacent parallel rails. Depending on requirements, these spacing means are constituted by helical wires which are each wound in a helix of constant pitch on the external surface of each fuel pin and secured at one end to the end-cap of said pin, the point of initial attachment of the wire of each pin being displaced by 60° about the axis of the pin with respect to the plane of the groove which is slidably fitted on the rail. Alternatively, the spacing means can consist of an overthickness of the end-cap so that the end-caps of one row of pins are in contact with the end-caps of the adjacent row. The overthicknesses of the end-caps can have either a cylindrical or prismatic profile.

Further characteristic features of a supporting device in accordance with the invention will become apparent from the following description of an exemplified embodiment which is given by way of indication without any limitation being implied, reference being made to the accompanying drawing in which the single FIGURE is a diagrammatic cutaway view in perspective showing one form of construction of the device under consideration.

In this FIGURE, the reference 1 designates diagrammatically a portion of a fissile or fertile fuel assembly, especially for a fast reactor. In a manner which is conventional in itself, said assembly is constituted by an external wrapper 2 having a cross-section in the shape of a regular polygon and especially a hexagon. Said wrapper 2 is preferably formed of stainless steel and has an extension at the lower end in the form of a positioning end-fitting 3 which is shown partially in the FIGURE and serves to maintain the wrapper in the vertical position when this latter is placed within the reactor core. In the drawing, the arrow represents the direction in which a coolant liquid usually consisting of sodium circulates within the reactor core through the fuel assembly 1. Said coolant thus flows through the bottom end-fitting 3 and the wrapper 2 towards the top of the fuel assembly.

There is mounted within the interior of the wrapper 2 a member 4 for supporting the cluster of fissile or fertile fuel pins which will be described hereinafter. Said supporting member 4 comprises at the lower end thereof a ring 5 which is stationarily fixed with respect to the wrapper 2 by means of screws 5a disposed at angular intervals of 120° about the common axis of the ring 5 and of the wrapper 2. Said ring 5 has a central bore 6 for the flow of coolant sodium and has an extension towards the upper portion of the wrapper in the form of a substantially conical sleeve 7 provided at the upper extremity with a tubular member 8 which is joined on the one hand to the sodium circulation bore 6 and is provided on the other hand with a polygonal external contour which closely conforms to the internal profile of the wrapper 2.

The member 8 is provided in its external surface with an open groove 9 which is formed along the entire periphery of said member or alternatively, as in the case illustrated in the FIGURE in which said member is mounted within a wrapper having a hexagonal cross-section, the groove is constituted by two diametrically opposite half-grooves 9a and 9b each extending along two consecutive sides of the cross-sectional hexagon.

The fuel assembly wrapper 2 surrounds a cluster of fuel pins 11, the constructional detail of which has little bearing on the invention. In accordance with known practice, said fuel pins 11 each have an external can especially of steel which is closed at both ends by end-caps 12. Each end-cap has a transverse slot or groove 13 for positioning said fuel pins 11 in rows of parallel pins by slidably engaging these latter row by row on a rib 14 of a rail 15. The complete pin-cluster assembly thus calls for the use of a series of rails 15 which are parallel to each other. Each rail has a generally flat shape and carries a row of fuel pins which are engaged on said rail and capable of sliding along the corresponding rib. The spacing of the fuel pins in each row and if necessary from one row to the adjacent row is ensured by means of a wire 11a which is helically wound on the external surface of the can of each fuel pin.

In order to provide a system in accordance with the invention for supporting the rails 15 which in turn carry the rows of fuel pins 11, provision is made for a series of parallel slots 16 formed in the upper portion of the member 8 which terminates the supporting member 4. The lateral extremities of each rail 15 are intended to engage respectively in said series of slots while ensuring suitable spacing of the rails and suitable positioning of all the pins of the fuel cluster within the wrapper 2. Once the rails 15 have been engaged within the slots 16 of the member 8, said rails are locked in position at the level of the open groove 9 or of the grooves 9a and 9b formed in the external surface of said member by mounting within said grooves a locking-rod 17 which is adapted to cooperate with a notch 18 formed in the sides of each rail 15 at the level of the grooves 9a and 9b after engagement of said rails within the slots 16. By way of alternative, the locking-rods 17 can be replaced by cross-pins (not shown in the drawing) which penetrate into each rectilineal portion of the groove 9 and pass through holes formed in the corresponding ends of the rails 15. Moreover, it can prove advantageous to improve the spacing and supporting of the rails 15, especially in their central portion at the center of the bore 6. Positional locking of said rails can thus be completed by a comb 19 mounted within a recess 20 formed in the member 8. Said comb 19 extends at right angles to the plane of the rails so that the slots 21 formed between the teeth of said comb are traversed by the rails as shown in the drawing.

In other alternative embodiments, it is also possible to employ means for ensuring suitable spacing of the fuel-cluster pins 11 from one row to the other, not at the level of the rails but at the level of the fuel pins themselves or of their end-caps. In particular, in accordance with an arrangement which has already been described and claimed in French patent Application No EN 74 10905 filed Mar. 28, 1974, corresponding to U.S. application Ser. No. 557,312, in the name of Commissariat a l'Energie Atomique in respect of "Device for supporting a fuel-pin cluster within a nuclear reactor fuel assembly wrapper," provision could be made for helical wires 11a which are positioned on each fuel pin 11 by displacing the points of attachment of said wires to the end-caps 12 of said pin by 60°, with the result that the fuel pins of one row are spaced with respect to the pins of an adjacent row carried by the adjacent parallel rail. Steps could also be taken to form overthicknesses of either cylindrical or prismatic shape on the fuel-pin end-caps 12 in order to establish a mutual contact between the pins of one row and the pins of adjacent rows.

As has been brought out by the foregoing, it is readily apparent that the invention is not limited to the example of construction which has been more especially described with reference to the accompanying drawing but is intended to include all alternative forms of construction within its scope. In particular, apart from the above-mentioned application to a fissile or fertile fuel assembly, the invention can also apply to a control assembly constituted by a cluster of pins containing neutron-absorbing material, such pins being placed within a vertical wrapper which is similar to the wrappers of reactor core fuel assemblies.

What we claim is:

1. A device for supporting a cluster of fuel pins having lower end-caps within the wrapper of a nuclear reactor fuel assembly comprising a coaxial supporting member at the lower end of the vertically disposed fuel assembly wrapper, a series of parallel rails, grooves in said lower end-caps engaging on the upper extremities of said rails, vertical parallel slots in said supporting member engaging lateral extremities of said rails, locking means securing said rails in said slots including open grooves in the sides of said supporting member extending along said vertical slots, and said locking means annularly engaging portions of said rails in said grooves and within said vertical slots.

2. A device according to claim 1, said locking means including locking-rods engaged within said open grooves in notches in said rails at the level of said grooves.

3. A device according to claim 1, said locking means being cross-pins passing through said parallel rails at the level of said open grooves.

4. A device according to claim 1, including a transverse comb extending at right angles to the plane of said rails in the central plane of said supporting member, and teeth in said comb being separated by said slots.

5. A supporting device according to claim 1, including means for spacing the fuel pins in the cluster directly connected to the fuel pins to ensure a constant spacing between a row of fuel pins on one of said rails and a row of fuel pins carried by an adjacent one of said parallel rails.

6. A supporting device according to claim 5, said spacing means including a helical wire wound in a helix of constant pitch on the external surface of each fuel pin and secured at one end to and at the level of the lower end-cap of said fuel pin, the point of attachment of said wire of each fuel pin being displaced by 60° about the axis of said pin.

7. A supporting device according to claim 5, said spacing means including an overthickness of said lower end-cap so that the end-caps of one row of fuel pins are in contact with the end-caps of an adjacent row of fuel pins.

8. A supporting device according to claim 7, wherein said overthicknesses of the end-caps each have a cylindrical profile.

9. A supporting device according to claim 7, the overthickness of said end-caps each have a prismatic profile.

* * * * *